Figure 1:
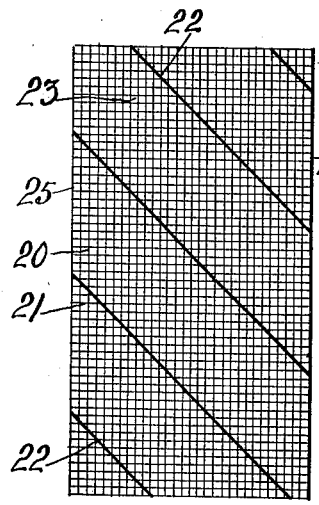

Oct. 13, 1925.

R. B. RESPESS 1,557,329

CORD TIRE FABRIC AND METHOD OF MAKING THE SAME

Filed July 19, 1920     3 Sheets-Sheet 1

Inventor
Roland B. Respess
By his Attorney
A. A. de Bonneville

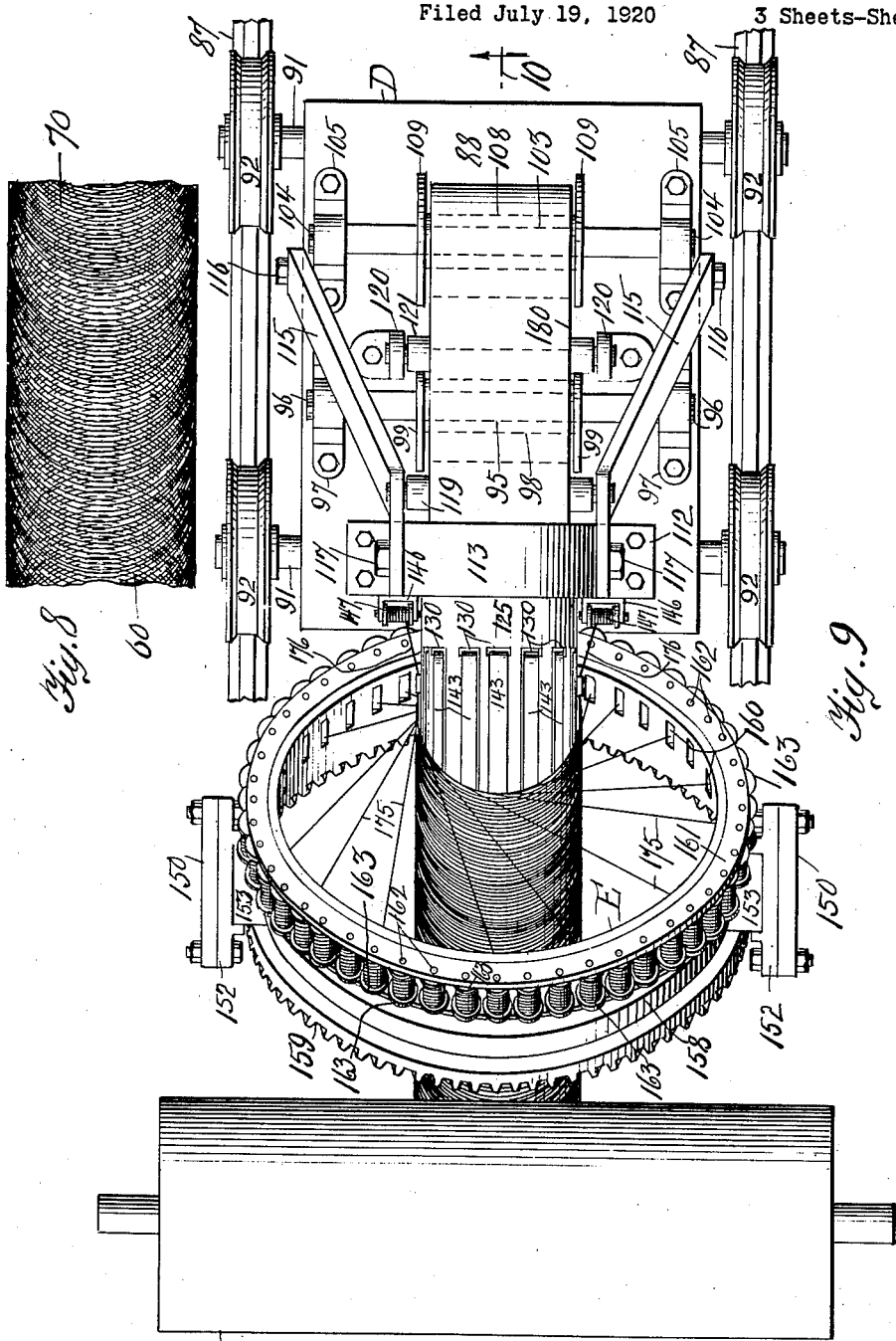

Oct. 13, 1925.
R. B. RESPESS
1,557,329
CORD TIRE FABRIC AND METHOD OF MAKING THE SAME
Filed July 19, 1920   3 Sheets-Sheet 3
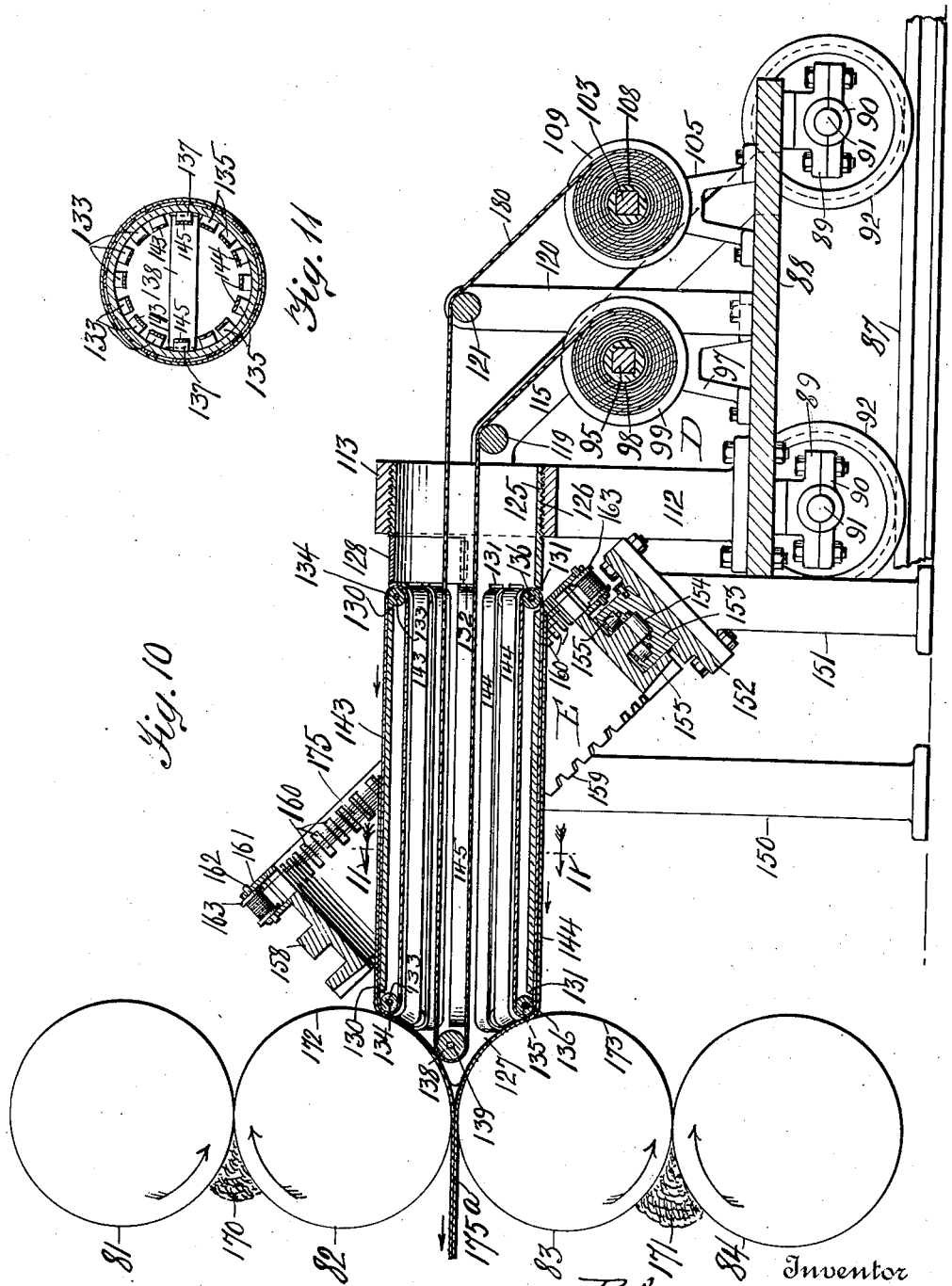
Inventor
Roland B. Respess
By his Attorney Patented Oct. 13, 1925.

1,557,329

UNITED STATES PATENT OFFICE.

ROLAND B. RESPESS, OF NEW YORK, N. Y., ASSIGNOR, BY MESNE ASSIGNMENTS, TO RESPRO INC., OF CRANSTON, RHODE ISLAND, A CORPORATION OF RHODE ISLAND.

CORD TIRE FABRIC AND METHOD OF MAKING THE SAME.

Application filed July 19, 1920. Serial No. 397,451.

*To all whom it may concern:*

Be it known that I, ROLAND B. RESPESS, citizen of the United States, and resident of the borough of Manhattan, city of New York, in the county of New York and State of New York, have invented certain new and useful Improvements in a Cord Tire Fabric and Method of Making the Same, of which the following is a specification.

This invention relates to tire fabrics and the method of making the same. The subject matter of this invention is an improvement of my patent application for unwoven fabric and the process for making the same, filed March 13th, 1919, Serial Number 282,501, and of my patent application for fabric and process for making the same, filed June 20th, 1919, Serial Number 305,595. The invention relates particularly to the fabric of inner casings and its method of construction from the fabrics described in the said applications. The fabric is particularly applicable to shoes of the ordinary rubber tire of automobiles.

In general terms the purpose of my invention is to construct new tire fabric of threads or cords similar to that which is known in the trade as cord tires. The latter are composed of layers of cords or threads with the ends thereof anchored around beads in the edges or rims of the casings, with one set or layer of cords or threads running from one side of the tire at an angle over the crown of the core in practically straight line directions to the other side of the tire, and the next adjacent set or layer of cords or threads run from one side of the tire in practically a straight line direction and at right angles to the first set or layer of cords or threads. The difference between my invention and the above described cord tire consists in locating the cords or threads of one set or layer to run from one side of the casing in practically a semi-circular, semi oval or semi spiral form over the crown of the casing to the other side of the same where the end of each cord or thread is set in the edge or bead opposite to the point from which they begin, with the next succeeding set or layer of cords or threads running in the opposite direction to the direction of the first set or layer and forming loops over the cords or threads of the first set or layer.

The purpose of my invention is to produce a fabric which when used for a tire casing, the strains on the fabric are greatly reduced to obtain great strength and resiliency for the casing. In contemplating the said invention I take into consideration the fact that the strength and resiliency of a casing depends upon the disposition of the fibers of its fabric. These fibers are twisted to make a cord or thread and in so doing the fibers are brought under unequal strains. The strength of the individual fiber is weakened by the tortional strain therein and when the cords or threads are subjected to tension, the fibers which bear the greatest tortional strain snap and thereby weaken the entire structure. This is especially true when the cords or threads are bent at sharp angles under tension and which fact is recognized by tire makers. The improvements in tire making of recent years lie chiefly in eliminating the bending strain which occurs in woven fabric, by constructing tires of cords or threads which are not woven.

The factors of weakness in the woven type of tire casings are the bending strains on the fibers in weaving the fabric, the increased tortional strain on the fibers when the woven cords or threads are brought under tension and the direct tensional strain produced by placing the cords or threads in the casing in a practically straight direction. The improvement in the ordinary cord type of casing over the woven type is the elimination of the bending strain contained in the weave, but the generally straight direction of the cords or threads of the woven type is retained in the cord casing and the tortional strain on the individual fibers come into action quickly under a blow.

In my invention I place the cords or threads in a manner, that it is difficult for any strain to be brought on the individual fibers, and while I do not contend that I entirely eliminate the bending, tension and tortional strains I do reduce their effect to the extent that great strength and flexibility is secured for the fabric in my casing. In a casing made of my fabric I entirely eliminate the straight line direction of the cords or threads from one side of the tire over the crown to the other side of the casing, and in my construction the bending of any individual cord or thread does not usually occur at right angles to the length of any cord or thread and I therefore reduce the tortional strain on the individual fibers resulting from such bending.

To distinctly bring out the novel features of the invention a few diagrammatic drawings, in addition to the drawings exemplifying the casing and its method of manufacture, are represented herein to indicate the nature of the casings heretofore constructed.

Figure 2:
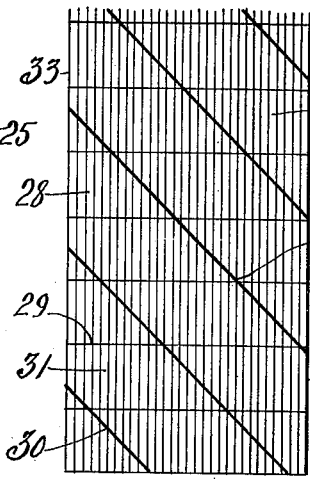
Figure 3:
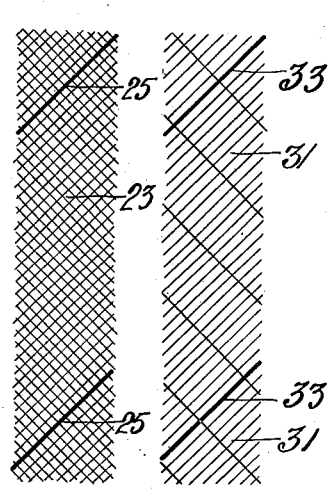
Figure 4:
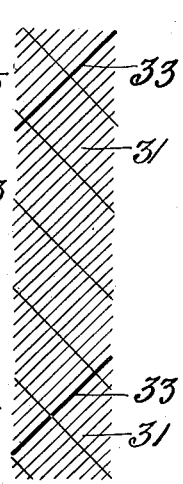
Figure 5:
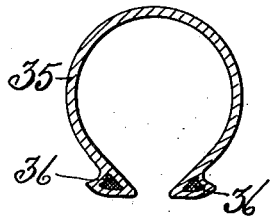
Figures 6, 7:
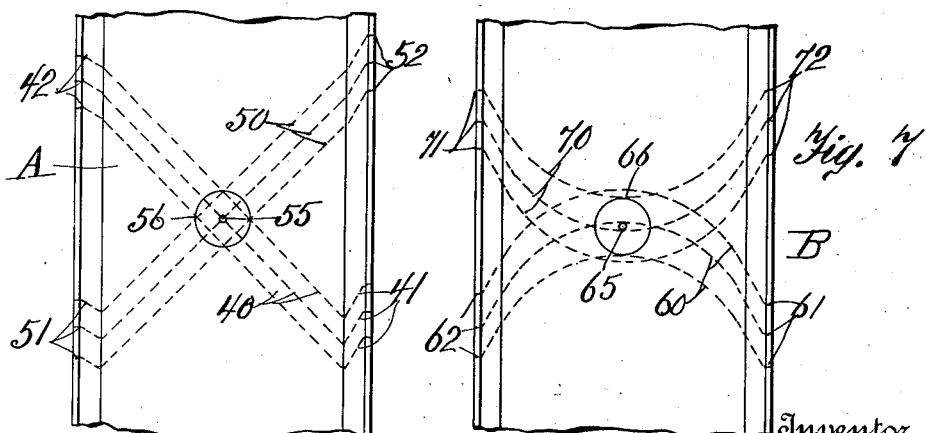

Fig. 1 represents a plan view of a fabric used in the woven type of an inner casing for tire shoes; Fig. 2 shows a plan view of a cord fabric for inner tire casings; Fig. 3 is a plan view of sections of woven fabric joined to make a tire casing; Fig. 4 represents a plan view of sections of a cord fabric joined to constitute a tire casing; Fig. 5 shows a cross section of a tire casing for shoes made of my fabric; Fig. 6 represents a plan of a cord tire casing flattened out, as heretofore constructed; Fig. 7 shows a plan view of a cord tire casing made of my fabric flattened out; Fig. 8 represents a top plan view of a cord tire casing of my fabric; Fig. 9 shows a plan view of apparatus to produce the new cord or thread casing; Fig. 10 shows a section of Fig. 9 on the line 10, 10; and Fig. 11 is a section of Fig. 10 on the line 11, 11.

In Fig. 1 a woven fabric is shown to consist of the longitudinal warp threads 20 and the horizontal filler threads 21. The numeral 22 indicates the directions in which the fabric is cut on the bias to receive suitable sections 23, to construct an inner casing for a tire. The selvedges are indicated at 25. In Fig. 2 a cord fabric is indicated with the longitudinal warp threads 28, and the horizontal filler threads 29, that are generally woven about one half inch apart so as to be easily broken, and are only intended to maintain the warp threads 28 in parallel directions when rubberized. The filler threads 29 enable the operator to handle cut sections, when cut as indicated on the lines 30, to form the sections 31 used in building a tire casing. The selvedges of this cord fabric are shown at 33. Fig. 3 shows a plan view of the sections 23 of Fig. 1 of woven fabric which have been rubberized and in which the selvedges 25 are shown adjacent to each other.

Fig. 4 shows a plan view of the sections 31 of the cord fabric which have been rubberized with the selvedges 33 adjacent to each other.

In Fig. 5 a cord tire casing of my fabric is indicated in its entirety by the numeral 35, and the beads of the casing are shown at 36.

Fig. 6 which shows a plan view of a cord tire casing A, flattened out and as usually constructed. It consists of a series of cords or threads 40 that make right angles with an adjacent series of cords or threads 50. The cords 40 start at 41 on one edge of the casing and run diagonally across the crown thereof to its other edge and terminate at 42. The cords 50 start at 51 on one edge of the casing and run diagonally across the casing over the crown to its other edge and terminate at 52, crossing the cords 40 at about right angles. The circles 55 and 56 theoretically represent the effect of a blow on the crown of the casing. The blow at first affects one of the cords 40 and one of the cords 50 as shown by the small circle 55, and instantly thereafter affects the remaining cords to strains in circular wave line directions as indicated by the circle 56, subjecting them to tensile and tortional strains.

In Fig. 7 a casing with my cord fabric flattened out is indicated in its entirety by the letter B. In this casing a series of cords or threads 60 start at 61 on one edge thereof and extend over its crown in a semi-circle, semi-oval or semi-spiral direction to the other edge and terminate at 62. Cords 70 start at 71 at one edge of the casing, extend over the crown thereof in semi-circle, semi-oval or semi-spiral directions to the other edge of the casing and terminate at 72. Circles 65 and 66 theoretically represent the effect of a blow on the crown of the casing B. It is evident that a blow on the crown of the casing B would have the tendency to swing the cords 60 and 70 on their end portions 61, 62 and 71, 72. This produces a cushion of said cords and casing. Great resiliency is obtained with this improved construction, by reason of the fact that the effect of a blow on the casing tends to flatten its loops of cords or threads. The air pressure in the inner tube of the tire cushions the blow, so the strain on the fabric comprising my improved casing will be chiefly from the inward pressure of the air, equally distributed within the entire inner tube and the casing.

In Fig. 8 a casing is shown with my fabric and in which the cords 60 and 70 upon which the strength of the structure depends run in two directions, but differs from woven fabric in the directions that the cords or threads take. The two opposing series of cords or threads compose a laminated double sheet instead of a woven sheet. My cord fabric for the casings differs from both woven and cord fabrics in that it is not required to be cut on the bias for the casing. It is made of any desired width in rolls of any required length and may be placed around the core of a tire in a continuous piece, with as many layers of the double sheets of fabric as desired. The two series of cords are held together by a rubber compound placed between them when making the fabric, and the bead is inserted in the usual manner.

In making an inner tire casing for a shoe or wheel of my fabric, no new or radical departure from present methods of tire manufacture is required. My cord fabric is a sheet of material to be used in the same manner as any rubberized sheet fabric is used in tire construction. It may be used in the manner described in my patent application for unwoven fabric and the process for making the same, filed March 13th, 1919, Serial Number 282,501 or in my patent application for fabric and process for making the same, filed June 20th, 1919, Serial Number 305,595, or in the manner described herein, or by any similar method to arrive at the same result. My cord fabric may possibly be constructed on a form with a tire looping machine.

Referring to Figs. 9 and 11, pressure calender rolls 81, 82, 83 and 84 are disposed one over the other with their axes in the same vertical plane. The upper roll 81 and lower roll 84 turn faster than the rolls 82 and 83 which latter rotate at the same speed.

Tracks 87 support a truck indicated in its entirety by the letter D. The said truck comprises the platform 88 which has connected thereto journaled bearings 89 having the caps 90. Axles 91 are journaled in the bearings 89 and have fastened thereto the wheels 92 that roll on the tracks 87. A square axle 95 has formed at its ends journals 96 that are journaled in journal brackets 97. The latter are supported on the platform 88. A spool 98 with the flanges 99 is supported on the axle 95. A square axle 103 has formed at its ends the journals 104. Journal brackets 105 supported on the platform 88 have journaled therein the journals 104. A spool 108 with the flanges 109 is supported on the axle 103. A bracket 112 with the threaded sleeve 113 is supported upon the platform 88. Journal brackets 115 at their lower ends are fastened to the platform 88 by means of the bolts 116 and their upper ends are fastened to the sleeve 113 by means of the bolts 117. A guide roller 119 is journaled in the upper portions of the brackets 115. Journal brackets 120 are supported upon and fastened to the platform 88 and at their upper ends have journaled therein the guide roller 121. A tube 125 has a threaded end 126 which is in engagement with the threaded sleeve 113 of the bracket 112. The other end 127 of the tube is shaped to the curvature of the rolls 82 and 83. A portion of the wall of the tube 125 is provided with an opening with a hinged cover 128 conforming to the curvature of the tube.

Openings 130 are formed in the upper portion of the tube 125 and openings 131 are formed in the lower portion of said tube. Openings 132 are formed in the central portion of the tube 125. Rollers 133 are located in the openings 130 and are supported on pivots 134 journaled in the wall of the tube 125. Rollers 135 are located in the openings 131 and are supported on pivots 136 journaled in the wall of the tube 125. Rollers 137 are located in the openings 132 and are supported on the pivots not shown journaled in the wall of the tube 125. A guide roller 138 is supported on pivots 139 which are journaled in the apex of the tube 125. Conveyer belts 143 are supported on the rollers 133, conveyer belts 144 are supported on the rollers 135 and conveyer belts 145 are supported on the rollers 137. The belts 143 contact with the roll 82 and the belts 144 contact with the roll 83. Journal brackets 146 are fastened to the sleeve 113 and have journaled therein the spools 147.

A pair of brackets 150 are located on opposite sides of the tube 125 and a bracket 151 is located below said tube. Each of the brackets 150 and 151 has fastened thereto a supporting block 152 which in turn has fastened thereto a roller bearing block 153. End rollers 154 and side rollers 155 are journaled in the blocks 153. A circular loom frame is indicated in its entirety by the letter E. It has formed in its circumferential surface the annular ring 158 which bears against the rollers 154 and 155, and teeth 159 are formed in one edge of its rim which mesh with a spur gear not shown.

At the opposite edge of the loom frame E there are formed a plurality of openings 160 and over said openings is secured a spool frame 161 which has journaled therein a plurality of spindles 162 that carry spools 163.

To carry out the steps of the process a gum rubber compound 170 is introduced between the rolls 81, 82 and a similar rubber compound 171 is introduced between the rolls 83 and 84. With the rotation of the rolls a thin film or sheet of rubber 172 is carried on the roll 82 and a thin film or sheet of rubber 173 is carried on the roll 83. Rubberized threads or cords 175 are carried on the spools 163 of the circular loom frame E. The cords 175 are rubberized by being run through a bath of rubber cement. The solvent of the cement is then evaporated leaving the cords or threads with an adhesive coating. The windings of the cords or threads on the tube 125 are started by means of a detachable circular comb or reed. The cords or threads 175 are threaded in the comb or reed, and the loom frame E is turned to properly start them around the tube 125. The comb or reed is then removed. Spools 147 are arranged substantially in the horizontal plane of the bite of the rollers 82, 83. These spools are wound with the rubberized cords or strands 176 which are carried forwardly in parallel relation and between the rollers 82 and 83. These cords or strands 176 constitute warp or selvage members which define the lateral edges of the completed fabric.

If desired the fabric as completed is provided with a rubber core. This core is provided by mounting a thin sheet of rubber upon a flexible conveyer belt 180 which is initially wound upon the spool 108 and which extends axially through the tube 125, over the roller 138 and thence rearwardly and over the spool 98, upon which it is rewound. The conveyer belt thus serves to carry the rubber sheet to a point adjacent to the bite of the rollers 82 and 83.

When a machine is placed in operation, the rolls 82 and 83 continuously draw off the selvage cords 176 and the sheet of rubber presented by the belt conveyer. At the same time, the frame E rotates and winds the strands 175 in parallel relation upon the outer surface of the tube 125 to form a compound helix, the several spires of which are substantially in contact with each other. This helix engages the outer runs of the endless belts 143 and 144 and is thus progressively moved toward the rollers 82 and 83. As the successive spires of the helix approach the rollers their upper and lower portions successively come into contact respectively with the thin sheets or films of rubber carried by the rollers 82 and 83 respectively. This contact of the upper and lower portions of each spire with the respective rollers causes each spire to be bent substantially in the horizontal plane of the selvage cords and this bending continues until the upper and lower portions of the spires are brought into planes substantially parallel with that of the selvage cords. These portions of the spire form substantially semi-circular bights, which project in opposite directions. The upper and lower series of bights thus formed are carried onward between the rollers 82 and 83 and are thereby embedded in the opposite sides of the centrally disposed rubber sheet. At the same time the films of rubber carried by the rollers 82 and 83 are pressed against the remote surfaces of the two series of bights and the several parts are thus formed into an integral structure.

Having described my invention what I claim and desire to secure by Letters Patent is:—

1. That method of making unwoven tire fabric comprising winding strands to form a helix, bringing opposite portions of each spire of the helix into contact with a sheet of rubber, turning such opposite portions of each helix to lie in substantially parallel planes, and subjecting the two ply fabric thus formed to pressure.

2. That method of making unwoven tire fabric comprising winding strands to form a helix, passing a sheet of rubber axially through the helix, turning opposite portions of each spire of the helix to cause them to lie in planes substantially parallel to that of the sheet of rubber, and pressing such portions into said sheet.

3. That method of making unwoven tire fabric comprising winding a plurality of strands to form a compound helix, passing a sheet of rubber axially through the helix, introducing a warp strand into the helix at either edge of the rubber sheet and substantially in the plane of the latter, bending each spire of the helix to cause its opposite portions to lie substantially parallel to and upon opposite sides of the rubber sheet, and pressing such portions of the helix into the rubber sheet.

4. That method of making an unwoven tire fabric comprising interwinding a plurality of rubberized strands to form a compound helix, passing a sheet of rubber axially through the helix, bending each spire of the helix to cause its opposite portions to lie substantially parallel to the rubber sheet and upon opposite sides of the latter, bringing sheets of rubber into contact with the remote surface of such opposite portions of each spire of the helix, and pressing the several parts to form an integral structure.

5. That method of making an unwoven tire fabric comprising progressively interwinding rubberized strands to form a compound helix, passing a sheet of rubber axially through the helix, moving a rubberized warp strand through the helix adjacent to either edge and substantially in the plane of the rubber sheet, progressively bending each spire of the helix to cause its opposite portions to lie in the form of substantially semi-circular bights upon opposite sides of the rubber sheet and parallel thereto, bringing a sheet of rubber into contact with each of such bights substantially simultaneously with the bending operation, and subjecting the several parts to pressure to form an integral structure.

6. An unwoven tire fabric comprising two superposed series of substantially semi-circular bights of a continuous strand and a layer of sheet material interposed between the two series.

7. An unwoven tire fabric comprising a plurality of strands each disposed to form two series of curved bights, and a sheet of rubber interposed between said series and having the bights embedded therein.

8. An unwoven tire fabric comprising a sheet of rubber, a selvage or warp strand adjacent to each longitudinal edge of the sheet and in the plane of the latter, and a series of strands each comprising two series of curved bights, the two series being disposed upon opposite sides of the sheet of rubber and the bights of each series lying in planes substantially parallel to the plane of the rubber sheet.

9. An unwoven tire fabric comprising a plurality of rubberized strands each comprising two series of curved bights, the bights of the two series lying in parallel planes, and a sheet of rubber interposed between the two series and united to the latter to form an integral structure.

10. An unwoven tire fabric comprising a sheet of rubber, a plurality of rubberized strands each disposed to form two series of substantially semi-circular bights, the bights of the respective series being pressed into opposite faces of the rubber sheet, and sheets of rubber engaging and united to the remote surfaces of the respective series of bights.

11. An unwoven tire fabric comprising a sheet of rubber, a selvage of warp strand adjacent to each longitudinal edge of the sheet, a series of rubberized strands each comprising two series of substantially semi-circular bights disposed upon opposite sides respectively of the sheet, the ends of each bight engaging the respective selvage strands and the intermediate portions of the several bights extending longitudinally of the fabric, and a sheet of rubber covering the remote faces of the two series of bights.

12. That method of making unwoven tire fabric comprising winding a series of strands to form a compound helix, passing a sheet of rubber axially through the helix, turning opposite portions of each spire of the helix to cause them to lie in contact with opposite surfaces respectively of the rubber sheet, bringing a second sheet of rubber into contact with the outer surface of the portions of the spires contacting with one side of the first sheet, and subjecting the several parts to pressure to form an integral structure.

13. An unwoven tire fabric comprising a plurality of strands each comprising two series of curved bights, the bights of the two series lying in parallel planes, a sheet of rubber interposed between the inner faces of the bights of the respective series, and a sheet of rubber overlying the outer faces of the bights of one of said series, the several parts being united to form a unitary structure.

14. An unwoven tire fabric comprising a sheet of rubber, a plurality of rubberized strands each disposed to form two series of semi-circular bights, the bights of the respective series being embedded in the opposite faces of the rubber sheet, and a sheet of rubber overlying and incorporated with the outer face of the bights of one series.

Signed at the borough of Manhattan, city of New York, in the county of New York and State of New York this 9th day of July A. D. 1920.

ROLAND B. RESPESS.